(12) United States Patent
Inskeep et al.

(10) Patent No.: US 7,801,776 B2
(45) Date of Patent: Sep. 21, 2010

(54) METHOD OF CONTROLLING PRODUCT INVENTORY

(75) Inventors: Kimberly Inskeep, Palos Verdes Peninsula, CA (US); Scott Farquhar, Irvine, CA (US)

(73) Assignee: CAbi, LLC, Rancho Dominguez, CA (US)

( * ) Notice: Subject to any disclaimer, the term of this patent is extended or adjusted under 35 U.S.C. 154(b) by 652 days.

(21) Appl. No.: 11/194,211

(22) Filed: Aug. 1, 2005

(65) Prior Publication Data

US 2006/0085298 A1 Apr. 20, 2006

Related U.S. Application Data

(60) Provisional application No. 60/592,673, filed on Jul. 30, 2004.

(51) Int. Cl.
*G06Q 30/00* (2006.01)
(52) U.S. Cl. .................. 705/28; 705/26; 209/583
(58) Field of Classification Search .................. 235/385; 705/9, 16, 24, 26, 28; 709/223; 715/500; 209/563, 564, 583; 700/216, 240
See application file for complete search history.

(56) References Cited

U.S. PATENT DOCUMENTS

| | | | | |
|---|---|---|---|---|
| 5,717,597 A * | 2/1998 | Kara | .......................... | 705/408 |
| 6,269,344 B1 * | 7/2001 | Junger | .......................... | 705/28 |
| 6,974,928 B2 * | 12/2005 | Bloom | .......................... | 209/583 |
| 7,177,825 B1 * | 2/2007 | Borders et al. | ................ | 705/26 |
| 7,266,513 B2 * | 9/2007 | Chalmers et al. | .............. | 705/26 |

OTHER PUBLICATIONS http://web.archive.org/web/20001206131000/http://www.longaberger.com/living_room/consultant_finder.phtml.*
Peterson, Robert A.; Wotruba, Robert R. "What is Direct Selling—Definition, Perspectives and Research Agenda", The Journal of Personal Selling &Sales Management; Fall 1996; 16:4; ABI/Inform Global p. 1.*
Island Visual Solutions (http://web.archive.org/web/200210122349/www.islandvisual.com.au/DirectSalesCDB.htm.*
http://www.doncastercorp.com/doncaster/home/career/career.asp -Fall 2003.*
sland Visual Solutions (http://web.archive.~rg/web/2~~21~122349/www.is~andvisua~.c~ m.au/DirectSa~esCDB.htm.*
http://www.doncastercorp.com/doncaster/home/careerlcareer.asp -Fall 2003.*

* cited by examiner

*Primary Examiner*—F. Ryan Zeender
*Assistant Examiner*—Dana Amsdell
(74) *Attorney, Agent, or Firm*—Inskeep IP Group, Inc.

(57) ABSTRACT

A business method and system for executing the method that involves gathering merchandise orders at a show in the home of a hostess. The method compiles the merchandise orders while maintaining a relationship between each individual order and information pertaining to the guest making the order. The guest information maintains an association with the order throughout the method such that each order made at the show may be individually packaged and labeled, obviating the need for the hostess to sort the ordered items upon receiving them from a warehouse. The system stores records of all purchased items and maintains a running inventory of each item, accessible by the consultants so they may warn customers of potentially low inventories. The database also facilitates returns and exchanges of purchased items.

14 Claims, 19 Drawing Sheets

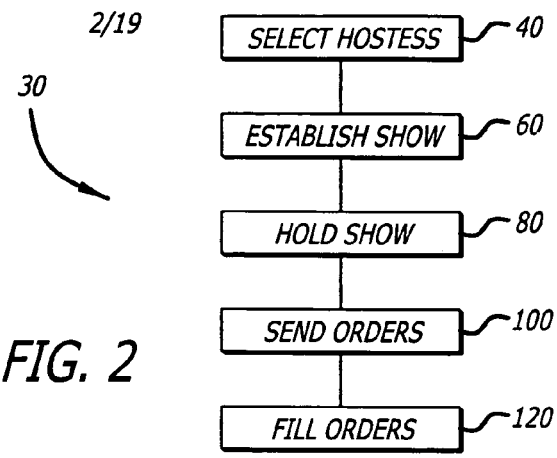
FIG. 2
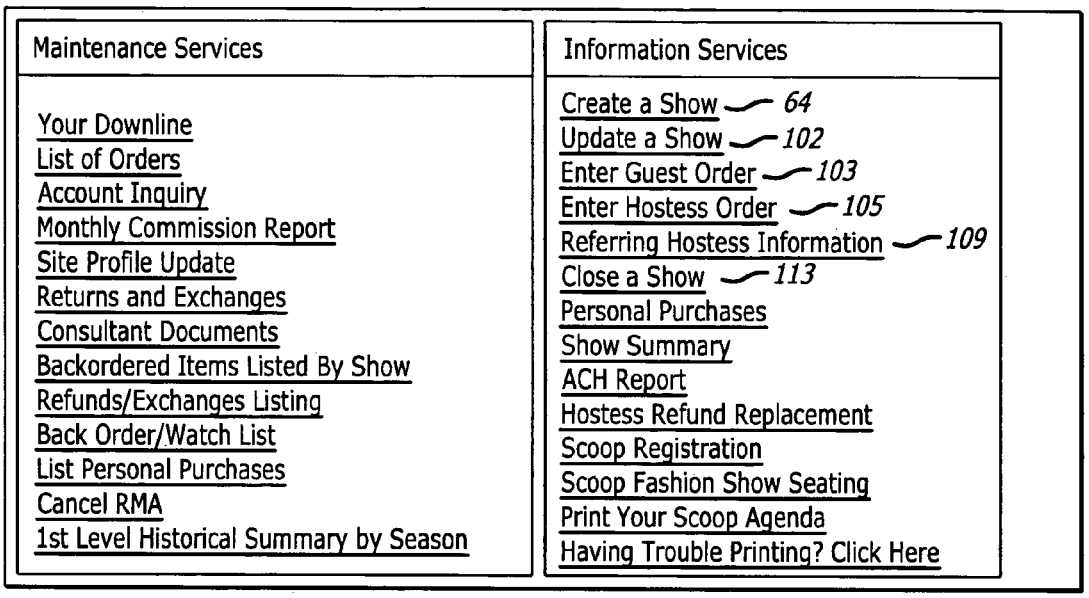
FIG. 3
FIG. 4

FIG. 5 — Guest Order Form

```
                                        EXIT TO MAIN MENU  |  LOGOFF

UPDATE A SHOW

Show Number:  [ 12402-- Doe, John -- 01/17/2004  ▽ ]

[ Submit ]
```

```
                                        EXIT TO MAIN MENU  |  LOGOFF

ENTER GUEST
                                                                    108
If the guest purchased items previously, enter her ID number: [          ]
                                                                    110
If you do not know her ID number or she does not have one; enter information below.

Enter her name (last name, first name): [ Guest, Jane    ]
        Enter the guest home phone number with area code: [ 714-555-1212 ]
                                   Show Number: [ 12402    ]
                                                         114         112
                          [ Submit ]
```

TEST SYSTEM

EXIT TO MAIN MENU | LOGOFF

ENTER HOSTESS ORDER

Show Number: 0-- No Eligible Shows For 0/0/00
Only enter hostess order if all guest orders have been entered.

[Submit]

EXIT TO MAIN MENU | LOGOFF

ENTER HOSTESS ORDER

Show Number: [ 0 -- No Eligible Shows Fo -- 0/0/00 ▽]

Referring Hostess ID: [ ]

Enter Current Show Number, not the show number for this hostess.

[Submit]

EXIT TO MAIN MENU | LOGOFF

CLOSE SHOW

Show Number: [ 0 -- No Eligible Shows Fo -- 0/0/00 ▽]

Do not close a show unless you have completed all Guest Orders and Hostess Orders.
Once a Show is Closed No Orders Can Be Changed.

[Close a Show]

SHOW SUMMARY

EXIT TO MAIN MENU | LOGOFF

Show Status: Closed  Confirmation Number: 122603  Show #:10823  Show Date: 08/24/2003  Hostess Order Row Color ☐

| Order # | Name | BK | PQV | CV | Sales Bef Disc | Host Disc. | Tax | S/H | Tot. Due CAbi | CC Fee | Tot. PD CAbi CC/GC | Tot. Due To (From) CAbi |
|---|---|---|---|---|---|---|---|---|---|---|---|---|
| 120562 | Dawn | | 363.00 | 363.00 | 363.00 | 0.00 | 29.95 | 0.00 | 392.95 | 9.23 | 392.95 | 9.23 |
| 122250 | Chyrl | | 201.00 | 201.00 | 201.00 | 0.00 | 16.78 | 15.50 | 233.28 | 5.48 | 233.28 | 5.48 |
| 122598 | Maria | | 69.00 | 69.00 | 69.00 | 0.00 | 5.69 | 0.00 | 74.69 | 1.76 | 74.69 | 1.76 |
| 122602 | Maria | | 104.00 | 0.00 | 208.00 | -129.00 | 8.58 | 0.00 | 87.58 | 2.06 | 87.58 | 2.06 |
| Totals: | | | 737.00 | 633.00 | 841.00 | -129.00 | 61.00 | 15.50 | 788.50 | 18.53 | 788.50 | 18.53 |

Hostess Discount=62%

[ Select Another Show ]

| Maintenance Services | Information Services |
|---|---|
| Your Downline<br>List of Orders<br>Account Inquiry<br>Monthly Commission Report<br>Site Profile Update<br>Returns and Exchanges —121<br>Consultant Documents<br>Backordered Items Listed By Show<br>Refunds/Exchanges Listing<br>Back Order/Watch List<br>List Personal Purchases<br>Cancel RMA<br>1st Level Historical Summary by Season | Create a Show<br>Update a Show<br>Enter Guest Order<br>Enter Hostess Order<br>Referring Hostess Information<br>Close a Show<br>Personal Purchases<br>Show Summary<br>ACH Report<br>Hostess Refund Replacement<br>Scoop Registration<br>Scoop Fashion Show Seating<br>Print Your Scoop Agenda<br>Having Trouble Printing? Click Here |

EXIT TO MAIN MENU | LOGOFF

Online Returns & Exchanges - Step 1

Will this be a return or an exchange?

Return ⊙ — 124

Exchange ○ — 126

Type in Original Order Number and press Submit.

Order Number: [185670|] — 128

|  | | | | EXIT TO MAIN MENU \| LOGOFF |
|---|---|---|---|---|

Online Return - Step 2

Order Number: 185670

Consultant: [Christina]

| Payment Details | |
|---|---|
| Pay Type | Amount |
| ✓ Visa | $ 248.90 |

Customer: [Jane Doe]
Address: [12345 Any St.]

City, St Zip [Any city, AS 90000]
Phone: [(123)345-6789]

Select items to be Returned — 134

| | style # | description | size | qty | amount |
|---|---|---|---|---|---|
| ✓ | 20716WHB | 716 White S Knit Tee | SMALL | 2 | $ 88.00 |
| ☐ | 20716WHB | 721 A/S 04 Pinstriped Pant | 4 | 1 | $ 69.00 |
| ☐ | 20716WHB | 801 Winter Wht. S Swtr Chev Fr | SMALL | 1 | $ 74.00 |

EXIT TO MAIN MENU \| LOGOFF

Online Return - Step 2

Order Number: 185670

Consultant: [Christina]

Customer: [Jane Doe]
Address: [12345 Any St.]

City, St Zip [Any city, AS 90000]
Phone: [(123)345-6789]

Select items to be Returned — 134

| style # | description | size | qty | amount |
|---|---|---|---|---|
| 20716WHB | 716 White S Knit Tee | SMALL | 2 | $ 88.00 |

RETURNING INFORMATION FOR ABOVE ITEM - (please fill out form below)

Return Reason: [Please Select Reason ▼] Return Quality: [1 ▼] — 150
Return Condition: [Good and Unused ▼] — 146  —144
Damage Location: [No Damage ▼] — 148

142

[Submit] — 152

FIG. 17 140

```
                                                    EXIT TO MAIN MENU | LOGOFF
Online Return - Step - Confirmation
ReturnReturnReturnReturn
                                                                      ┌─ 160
                    CLICK HERE TO PRINT THIS PAGE FOR YOUR RECORDS ──┘
┌──┐
│🖨│ PRINT THIS PAGE
└──┘
Email Return Label & Confirmation Form Link to Ordering Member
Ordering Member:      19260401 - John
Ordering Member Email: [John@email.com     ]
Email Copy?           ☐ Send a copy of the email to the address below
Email Copy To:        [Christina@email.com ]
Name to Email Copy To: [Christina          ]                        158
                      [Send Label & Confirmation Form]              ╲
                                              RMA Number: 58691 ────╯
                                              Order Number: 1388597

Consultant:  [Christina           ]    ┌─────────────────────────────┐
                                       │ Return Totals               │
Customer:    [Jane Doe            ]    │ Subtotal:          $79.00   │
Address:     [12345 Any St.       ]    │ Discount:           $0.00   │
             [                    ]    │ Sales Tax:          $6.52   │
                                       │ Freight:            $0.00   │
City, St Zip [Any city, AS 90000  ]    │ Miscellaneous:      $0.00   │
Phone:       [(123)345-6789       ]    │ Refund Total:      $85.52   │
                                       └─────────────────────────────┘
```

*FIG. 18*

```
┌─────────────────────────────────────────────────────────────┐
│ ☐Return Label-                                      ⬜⬜⊠    │
├─────────────────────────────────────────────────────────────┤
│ ┌─────────────────────────────────────────────────────────┐ │
│ │ ReturnReturnReturnReturn                                │ │
│ │                                                         │ │
│ │ ┌──┐                        164                         │ │
│ │ │🖨│ PRINT THIS PAGE  ────                               │ │
│ │ └──┘                                                    │ │
│ │   cut along line and attach CAbi RETURN LABEL to returned item and Mail to: │ │
│ │ ─────────────────────────────────────────────────────── │ │
│ │                   ┌──────────────┬──────────┐           │ │
│ │                   │ Order Number │ 736344   │           │ │
│ │                   ├──────────────┼──────────┤           │ │
│ │                   │ RMA #        │ 25679    │           │ │
│ │                   └──────────────┴──────────┘           │ │
│ │                                                         │ │
│ │                   CAbi, LLC - Returns Department        │ │
│ │                   18915 Laurel Park Rd.                 │ │
│ │                   Rancho Dominguez, CA 90220            │ │
│ └─────────────────────────────────────────────────────────┘ │
└─────────────────────────────────────────────────────────────┘
```

*FIG. 19*

EXIT TO MAIN MENU | LOGOFF

Online Returns & Exchanges - Step 1

Will this be a return or an exchange?

Return ○ — 124

Exchange ⦿ — 126

Type in Original Order Number and press Submit.

Order Number: [185670] — 128

EXIT TO MAIN MENU | LOGOFF

Online Return - Step 2

Order Number: 185670

| Consultant: | Christina |
| --- | --- |
| Customer: | Jane Doe |
| Address: | 12345 Any St. |
| | |
| City, St Zip | Any city, AS 90000 |
| Phone: | (123)345-6789 |

| Payment Details | |
| --- | --- |
| Pay Type | Amount |
| ✓ Visa | $ 79.48 |

Select items to be Exchanged

| style # | description | size | qty | amount |
| --- | --- | --- | --- | --- |
| 40792CH0 | (Non Returnable) Returned #: 25302 | 0 | 1 | $ 88.00 |
| ✓ 40803CRC | 803 Cream M Zip Front Mock Tur | M | 1 | $ 89.00 |

|  | EXIT TO MAIN MENU \| LOGOFF |
|---|---|
| Online Return - Step 2 | |

Order Number: 737662

Consultant: Christina

Customer: Jane Doe
Address: 12345 Any St.

City, St Zip: Any city, AS 90000
Phone: (123)345-6789

Items to be Exchanged

| style # | description | size | qty | amount |
|---|---|---|---|---|
| 40803CRC | 803 Cream M Zip Front Mock Tur | M | 1 | $ 89.00 |

RETURNING INFORMATION FOR ABOVE ITEM- (please fill out form below)

Exchange Reason: [Please Select Reason]   Exchange Quality: [1] — 178
Exchange Condition: [Good and Unused]   Exchange Color: [Black] — 180
Damage Location: [No Damage]   Exchange Size: [xs] — 182

— 176
— 174
172

[Submit] — 184

FIG. 22      168

| Maintenance Services | Information Services |
|---|---|
| Your Downline<br>List of Orders<br>Account Inquiry<br>Monthly Commission Report<br>Site Profile Update<br>Returns and Exchanges<br>Consultant Documents<br>Backordered Items Listed By Show<br>Refunds/Exchanges Listing<br>Back Order/Watch List — 196<br>List Personal Purchases<br>Cancel RMA<br>1st Level Historical Summary by Season | Create a Show<br>Update a Show<br>Enter Guest Order<br>Enter Hostess Order<br>Referring Hostess Information<br>Close a Show<br>Personal Purchases<br>Show Summary<br>ACH Report<br>Hostess Refund Replacement<br>Scoop Registration<br>Scoop Fashion Show Seating<br>Print Your Scoop Agenda<br>Having Trouble Printing? Click Here |

FIG. 25

|                                              EXIT TO MAIN MENU | LOGOFF |
| --- |
| Online Return - Step 4 - Confirmation |

ReturnReturnReturnReturn

CLICK HERE TO PRINT THIS PAGE FOR YOUR RECORDS — 190

🖨 PRINT THIS PAGE

Email Exchange Label & Confirmation Form Link to Ordering Member

| Ordering Member: | 19260401 - John |
| --- | --- |
| Ordering Member Email: | John@email.com |
| Email Copy? | ☐ Send a copy of the email to the address below |
| Email Copy To: | Christina@email.com |
| Name to Email Copy To: | Christina |

Send Label & Confirmation Form

RMA Number: 58693
Order Number: 1388597

188

| Consultant: | Christina |
| --- | --- |
| Customer: | Jane Doe |
| Address: | 12345 Any St. |
| City, St Zip | Any city, AS 90000 |
| Phone: | (123)345-6789 |

Items to be Exchanged

Back Order/ Watch List — 198

LOW=Stock is low and there is no additional stock on order
L-[DATE]=Stock is low and the date is when the next shipment is ready to ship to customer
OUT=Item not available at this time
B-[DATE]=Item is currently on back order and is expected and is expected to ship on date

| Item | Name | Color | XS | S | M | L | XL | 0 | 2 | 4 | 6 | 8 | 10 | 12 | 14 | 16 | ONE |
|---|---|---|---|---|---|---|---|---|---|---|---|---|---|---|---|---|---|
| 107 | Camisole | Black | | | L-LOW | | L-LOW | | | | | | | | | | |
| 107 | Camisole | White | | L-LOW | L-LOW | L-LOW | L-LOW | | | | | | | | | | |
| 108 | Kate Sweater | Passion | | | OUT | OUT | OUT | | | | | | | | | | |
| 133 | Jean Jacket | Mint Juleo | L-LOW | | | | | | | | | | | | | | |

200 — 202 — 204 (Size)

Dear Jane Doe

Please click on the link below to print the mailing label. Please use this label to return your CAbi items for processing.

You will find the RMA receipt below the return link.

Thank you and please contact me with any questions.

Sincerely,

Christina
(714) 123-4567
christinadoe@anyemail.com

Click here to open and print your Return Label — 212

| | | Confirmation Number: 59337 |
| --- | --- | --- |
| | | Order Number: 13428028 |

| Consultant: | Christina | Return Totals | |
| --- | --- | --- | --- |
| | | Subtotal: | $24.00 |
| Customer: | Jane Doe | Discount: | $0.00 |
| Address: | 12345 Any St. | Sales Tax: | $1.86 |
| | | Freight: | $0.00 |
| City, St Zip | Any city, AS 90000 | Miscellaneous: | $0.00 |
| Phone: | (123)345-6789 | Refund Total: | $25.86 |

Items to be ed

| style # | description | size | qty returned |
| --- | --- | --- | --- |
| S0910ASU | 910/ A/S All Dragonfly Pin | One Size | 1 |

Reason For: Please Select Reason -Condition of: Good and Unused
Damage on: No Damage

Dear Jane Doe

Please click on the link below to print the mailing label. Please use this label to return your CAbi items for processing.

You will find the RMA receipt below the return link.

Thank you and please contact me with any questions.

Sincerely,

Christina
(714) 123-4567
christinadoe@anyemail.com

Click here to open and print your Exchange Label — 216

Confirmation Number: 59337
Order Number: 13428028

| Consultant: | Christina |
|---|---|
| Customer: | Jane Doe |
| Address: | 12345 Any St. |
| City, St Zip | Any city, AS 90000 |
| Phone: | (123)345-6789 |

Items to be ed

| style # | description | size | qty returned | amount |
|---|---|---|---|---|
| S0910ASU | 910/ A/S All Dragonfly Pin | One Size | 1 | $24 |

Reason For: Please Select Reason -Condition of: Good and Unused
Damage on: No Damage

METHOD OF CONTROLLING PRODUCT INVENTORY

CROSS REFERENCE TO RELATED APPLICATIONS

This invention is related to and claims priority from U.S. provisional application Ser. No. 60/592,673 filed on Jul. 30, 2004 entitled Method of Controlling Product Inventory, which is incorporated herein by reference. Also incorporated by reference is U.S. patent Ser. No. 11/057,540, filed Feb. 14, 2005, entitled Single Order Method for Independent Sales Representatives.

BACKGROUND OF THE INVENTION

The traditional retail market is one of the oldest, and yet still most prevalent, business models for selling goods. One popular alternative to traditional retail shopping is the "party plan" direct marketing method of selling products. The party plan was made well known by the Tupperware® Corporation. Rather than buying the Tupperware® products from a retail store, groups of potential customers, usually women, get invited to a "show" or "party" (hereinafter a "show") at a host's home. The show is led by an independent sales consultant who showcases the products, enticing the partygoers into ordering the wares.

At the conclusion of the party, the consultant takes the orders and submits them to the company to be filled. Typically, the hostess maintains copies of all of the items ordered by the various customers. The consultant simply enters a "grand total" of the items ordered, including the hostess name and address, and sends the order to a factory or warehouse where the order is filled. The items are packed into a box and shipped to the hostess's house to save on shipping. Upon receiving the shipment, it is the hostess's responsibility to refer to the order forms and compile the individual orders from the shipment received: This step can take hours. The hostess will then notify each of the guests that ordered items that their newly purchased items may be picked up at the hostess's house.

After the items are received by the guests, if there are any returns to be made, the responsibility typically falls on the hostess to receive the item back from the guest and send it to the manufacturer, receive the exchange or credit, and pass the exchange or credit back to the guest. In consideration for hosting the party, the hostess is usually given a gift or a discount on one or more items of her order, based on the amount of merchandise sold during her show.

The party plan marketing model has expanded significantly to include products other than kitchen wares. Popular direct marketing companies have been established for baskets, candles, cosmetics and clothing. Clothing orders can be particularly burdensome on a hostess using the present model for several reasons.

First, in a given line of clothing there are usually a few items that are more popular so many of the guests will order this item. Often, the item comes in multiple sizes and colors. Thus, when the shipment arrives to the hostess's house, the task of compiling the various orders becomes even more difficult because the hostess has to ensure that each order receives not only the correct items, but the correct sizes and colors of each item.

Second, because each of the items requires sorting by the hostess, this puts the hostess in the undesirable position where she must decide whether she has the time and energy to organize and individually inspect each of the items to avoid having unsatisfied customers. Performing this task for numerous customers may lead to a decision not to host subsequent shows.

Third, clothing items tend to be returned more often than other types of purchases. Getting an item home and trying it on in a familiar environment, or even just in a different mood, can cause a buyer to regret a purchase. As described above, returns must be made by the hostess because only the hostess is in the manufacturer's database.

Fourth, many direct sales clothing companies require the sales consultant to act as the hostess due to the logistics of moving the large quantity of clothes typically shown at a show. Thus, typical direct clothing companies require their consultants to sign up for a block of time, usually two weeks, during which they take possession of the sample wardrobe. This sample wardrobe is of considerable size. The consultant receives the wardrobe and turns her house into a retail environment where she showcases the clothes constantly for two weeks. Rather than having parties or shows, she invites as many people as possible to stop by anytime during her possession of the wardrobe to try on and hopefully order clothes. After her block of time has elapsed, she packs up the sample wardrobe and sends it on to another consultant. The time during which she is in possession of the wardrobe is a time of considerable inconvenience to her family.

Fifth, most direct sales clothing consultants do not have access to company inventory data. If an item is sold out, the consultant is unable to warn a party guest before the guest places an order. The guest learns that her order was not filled when the shipment arrives at the hostess's house. This is disappointing for the guest, embarrassing for the hostess, and reflects poorly on the company.

The advent of the internet has given rise to other forms of direct marketing including online auctions, flea markets, and direct access to manufacturers. Web-based shopping has not obviated the "party plan," however. Many shoppers find there is no substitute for physically handling and examining an item while deciding whether to make a purchase. Women's clothing is an example of a product type where this is especially true. Most women will agree that seeing an outfit on a glamorous model in a picture on a website provides little comfort that they will like the way the outfit looks on them. A "party plan" marketing method has this major advantage over internet shopping as a business model for women's fashion. The internet, however, provides undeniable flexibility and management tools. Orders can be taken, reviewed, and tracked instantly. Nonetheless, few party-oriented direct sales methods utilize the versatility and convenience availed by the internet.

There is a need for a web-based business model that incorporates the advantages provided by the internet with the "party plan" direct marketing model. More specifically, there is a need for a web-based program that assists the hostess of a party in taking and placing orders. There is a further need for such a program that tracks information related to each customer and allows the customers to make returns and exchanges directly with the manufacturer. There is also a need for a web-based program that controls product inventory and provides a consultant with specific inventory-related data.

BRIEF SUMMARY OF THE INVENTION

The present invention fills the aforementioned needs by providing a web-based system for assisting an entrepreneur, such as an independent sales representative, in tracking and managing sales and benefits generated in a sales party environment. The present invention also assists the hostess of a party as it makes individually wrapped packages possible.

One aspect of the present invention provides a method for making sales transactions initiated at a show in the home of a hostess. The method includes gathering information about the hostess and the guests, including her address, and customer data such as name, address, and payment information. After the show, the information is entered into a database and sent to a warehouse via the internet. Because the customer data is also received, the warehouse is able to place the individual orders for each guest together in a package, and then ship a box or boxes containing the various packages to the hostess. The packages arrive neat and presentable. The hostess needs do no more than notify her guests that their packages have arrived so that the guests may pick up the packages from the hostess.

Another aspect of the invention provides a system for executing the aforementioned method. The system includes a consultant computer in data communication with a database. A server at warehouse holding the goods for sale is also in data communication with the database. The server is configured to perform the steps of receiving hostess information, guest information and customer orders. Next the server generates a show code based on the hostess information. The server then calculates billing totals, factoring in any discounts that may apply, and generates order forms for use at the warehouse in assembling the orders.

In another aspect of the present invention, the system tracks the nationwide or worldwide sales orders and compares the order for each item against a present and planned inventory. The consultants then have the ability to access the database to determine which items are in demand and at risk of selling out. The consultant can then convey this information to the guests of a party to allow them the immediate option of making alternative selections or preparing them for a potential delay.

In yet another aspect of the present invention, the system includes an automated return and exchange process that allows a consultant to generate shipping labels for those guests that have items they would like to return or exchange for other items.

BRIEF DESCRIPTION OF THE DRAWINGS

FIG. 2 is a chart of the business method of the present invention;

FIGS. 3-4 are menu screens of the present invention;

FIG. 5 is a customer order form of the present invention;

FIGS. 5-12 are menu screens of the present invention;

FIGS. 14-26 are menu screens of the present invention;

DETAILED DESCRIPTION OF THE INVENTION

Figure 1:
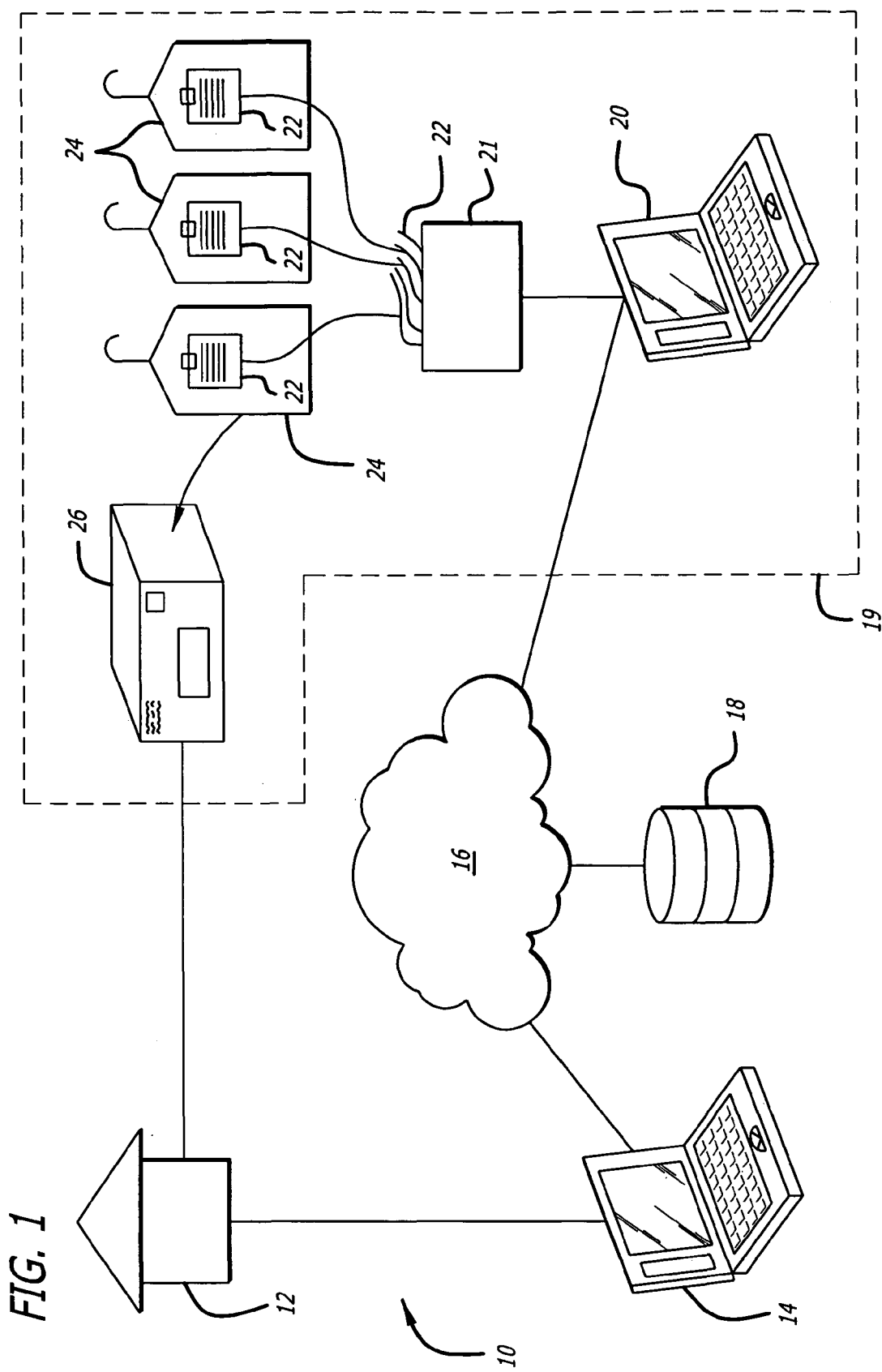
FIG. 1 is a schematic of the structure of the business model of the present invention.
Figure 13:
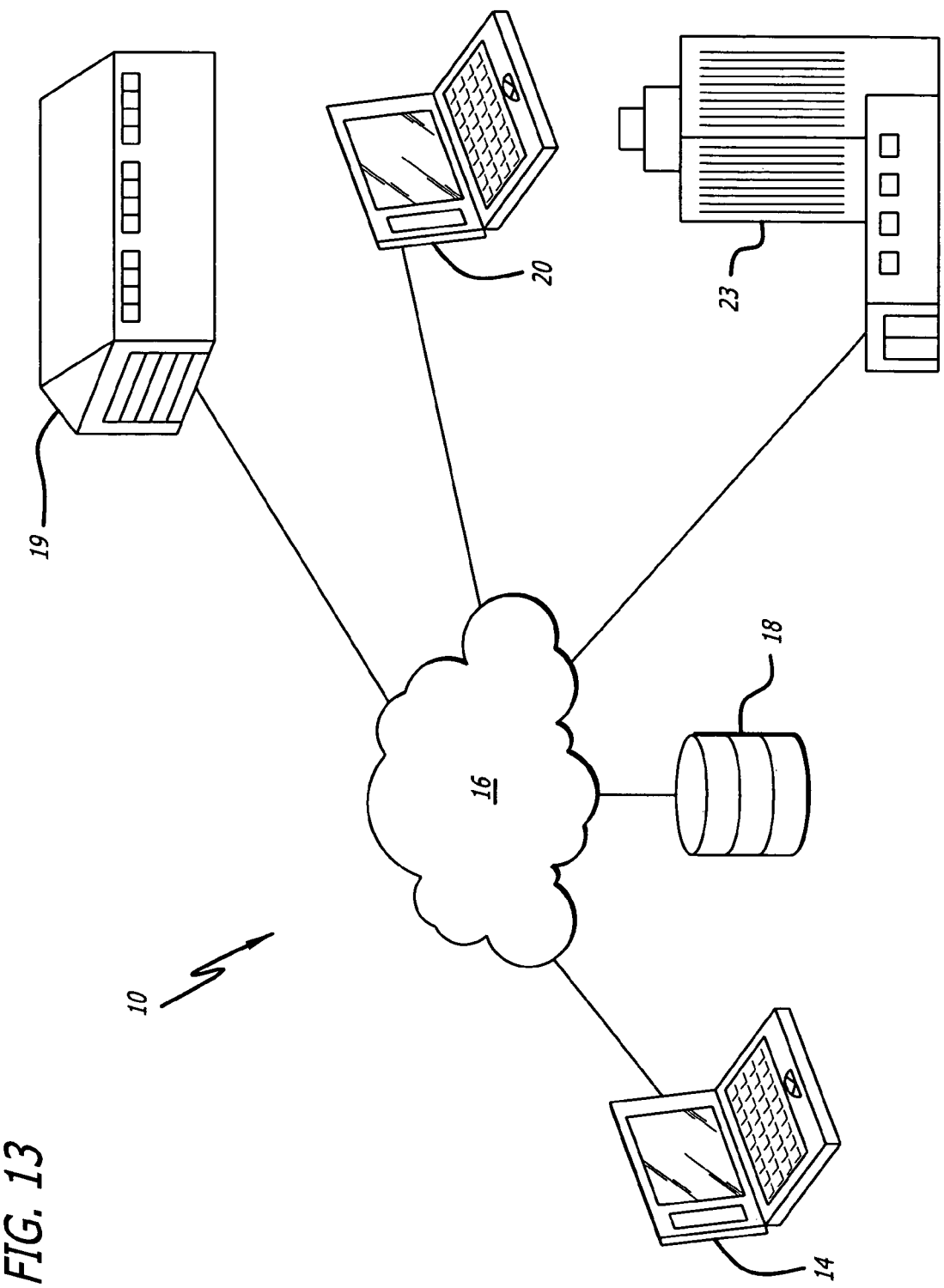
FIG. 13 is a schematic of the structure of the inventory system of the present invention.
Figure 24:

Referring now to the figures, and first to FIG. 1, there is shown a basic schematic diagram of the structure 10 of the business method of the present invention. The structure 10 includes a hostess home 12 where the show is to be held. The structure also includes a computer 14 having access to a network 16 in data communication with a database 18. The database 18 stores data on a computer readable medium and may or may not be located within a manufacturing site or warehouse 19. A server 20 is located at the warehouse 19 and is capable of generating orders based on the information stored in the database 18. Preferably, a printer or other form of interface 21 is in data flow communication with the server 20. The interface 21 is capable of producing order forms 22 containing the information generated by the computer 20. In the warehouse 19, the orders are taken and assembled into packages 24, which are then placed in a box 26 and shipped back to the hostess's home 12. One skilled in the art will realize that the server 20 could be stored at any location accessible by the network 16. For example, the server 20 could be located at a corporate headquarters 23 (FIG. 13).

The computer 14 may be any computational device capable of receiving information and sending it to a remote location via the network 16. Typically, the computer 14 will be a personal computer or laptop owned by the consultant. However, the computer 14 is basically a communications device and could be embodied as a handheld digital device, cellular telephone, or any telecommunications device capable of data transfer. Alternatively, the computer 14 could be the combination of a standard telephone and a computer-automated answering service.

The network 16 is likely the internet for purposes of convenience. However, an intranet, satellite link, or any other form of data communications link would be acceptable.

The database 18 is connected to the network 16 and has the capability of storing information on a computer readable medium. The database 18 may or may not be located within the warehouse 19. For example, the database 18 may be memory on a server at any location.

The computer 20 is preferably contained within the warehouse 19 and is in data communication with the network 16. The computer 20 is capable of manipulating data stored in the database 18 and generating order forms 22 and sending them to the interface 21.

The interface 21 is any form of output device capable of converting the information received from the computer 20 into a format readable by a means for assembling the merchandise on a given order 22. This means is typically a human worker and thus, the interface 21 would be a printer that generates printed order forms 22. Alternatively, the orders 22 could by assembled via automated machinery. In this case, the interface 21 may generate bar codes. In yet another embodiment, the interface may be a network, wireless or otherwise, that allows the computer 20 to communicate directly with automated machinery. In this case, a printer would be necessary to generate labels for the packages 24 and mailing labels for the boxes 26.

FIG. 2 outlines the general steps of the method 30 of the present invention. Each of these steps will be discussed in greater detail below and integrated with the aforementioned structure 10.

The method 30 begins with the selection of a hostess at 40. Hostess information is then entered into the database 18 and a show code is generated, thus establishing the show at 60. The show is then held at 80 where orders are taken for merchandise. The orders are sent to the warehouse 19 at 100 and are filled at 120. The merchandise is shipped back to the hostess's house where it is distributed to the guests who ordered the merchandise. Each of the steps will now be explained in greater detail.

Beginning with step 40, the hostess is chosen by the consultant. Quite often, a hostess will volunteer at a prior show to be the hostess of a future show. The hostess of the prior show will then be considered a "referring hostess" and will receive a discount if she attends the show at the hostess's house 12. The consultant and the hostess agree on a show date. Prior to the show date, the consultant may provide advice to the hostess in order to ensure a lucrative show. For example, the consultant may provide materials such as tip sheets, invitations, order guides, order forms, thank you cards, and the like.

Step 60 is completed by gathering information about the hostess and entering the information into the client 14 and sending it to the database 18 via the network 16. This information includes, at a minimum, the hostess's name. The show is then assigned a code. The show code will be used as a reference for the individual customer orders made at the show.

FIG. 3 shows a menu screen 62 the consultant will see upon logging in to the program via the network 16. Under the heading "Information Services" the option "Create a Show" 64 is selected. Doing so causes the menu screen 66 shown in FIG. 4 to appear. Here the consultant fills in a hostess ID number field 68 if the hostess has been established as a customer in the database 18 at a previous show. If not, the consultant enters the hostess's name in the hostess name field 70 and the hostess phone number in the phone number field 72. There may also be a field for hostess address. Alternatively, the hostess address will be entered from an order form filled in at the party.

At step 80, the show is held at the home of the hostess. The consultant brings a sample line of clothing to the hostess's home. Rather than leasing the sample line for a period of time, the consultant purchases the sample line from the company at or slightly below the cost to the company. In order to ensure their consultants are not simply becoming consultants to buy clothes at significantly reduced prices, the sample line includes a variety of sizes and is a set sample line package for all consultants. The consultants are not able to assemble a sample line of their own by ordering individual items at or below cost.

Furthermore, each consultant must meet several requirements. First, the consultant must purchase a new sample line each season (e.g. spring and fall). Second, each consultant must present their sample lines at a minimum number of shows per season (e.g. two shows per month). Third, each consultant must generate a minimum amount of gross sales per month (e.g. $10,000 per month during each season).

Understanding that, after a season is over, each consultant now owns a considerable number of clothing items in various sizes, each consultant is allowed to sell items from her sample line. This way, she is able to recoup some of the costs she has incurred.

Figure 5:
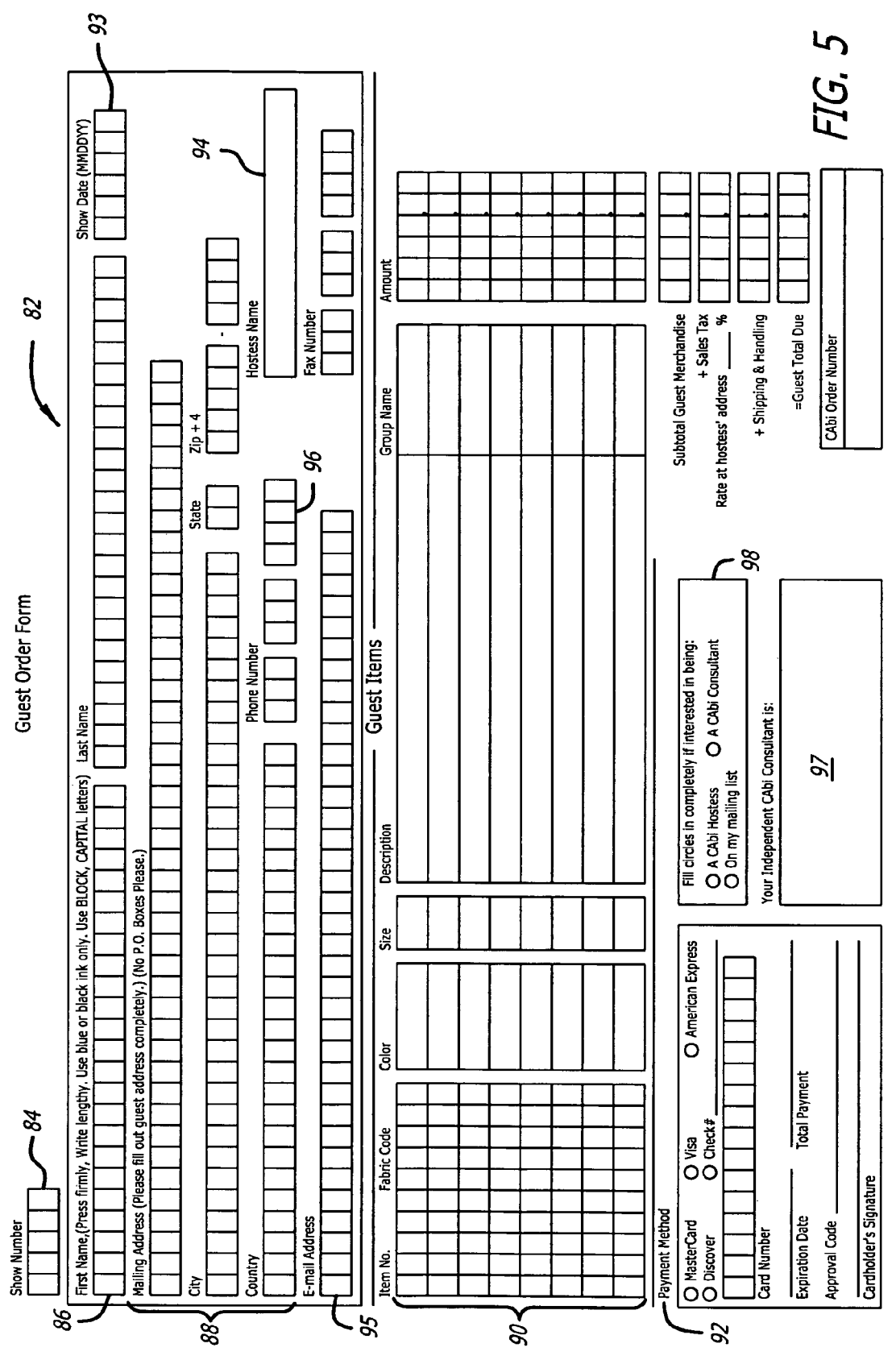

During the show, the consultant will introduce her sample line of merchandise and allow the guests to examine the same. Clothing items may be tried on by the guests. At the end of the show, order forms from the guests are received. FIG. 5 provides an example order form 82. These order forms include certain data fields such as the show code 84, the guest name 86, the guest address 88, the guest's order 90 of one or more merchandise items, and the payment account 92. Typically the payment account will consist of a credit card number and expiration date.

The order form 82 may also include data fields such as show date 93, hostess name 94, guest e-mail address 95, guest phone number 96, and consultant information 97. An interest field 98 may also be included giving the guest the option to express interest in hosting a future show or becoming a consultant.

At step 100, the consultant gathers the order forms 82 from the show, leaving copies with the hostess, and enters the information therefrom into her computer 14. She does so by first selecting the "Update a Show" option 102 from the menu in FIG. 3. Doing so causes the menu 104 of FIG. 6 to appear. Here, she enters the show code established at 60. Once the show code is entered, the menu 106 shown in FIG. 7 appears. Here, historical facts are collected related to the show. Data pertaining to each individual guest attending the show is entered. Specifically, the guest ID number is entered in field 108 if the guest has an established ID number from a previous show. If not, the guest's name is entered into the name field 110, and her phone number is entered into the phone number field 112. The program should fill in the show number automatically into the show number field 114.

Figure 8:
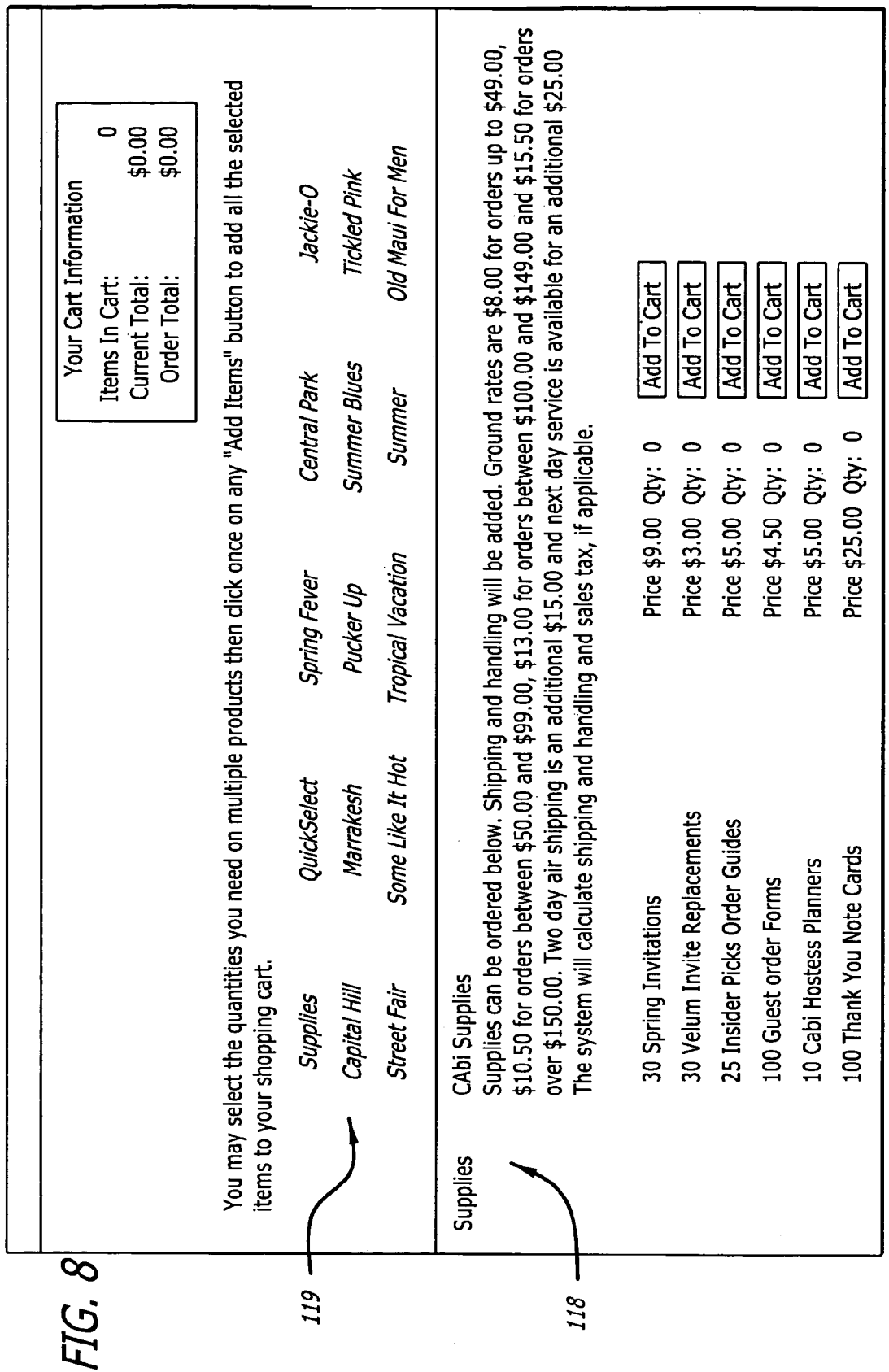

After the guest is entered into menu 106, "Enter Guest Order" 103 is selected from menu 62 (FIG. 3) and the order menu 116, shown in FIG. 8, will appear giving the entire line of products. The consultant carefully adds the correct quantities and sizes to the guest's cart from the guest's order form 82. The order menu 116 shows a submenu 118 listing all of the supplies a consultant might want to order and provide a future hostess. However, similar submenus 118 are made available from each of the various product lines shown in the product line submenu 119. This process is repeated for each guest, first entering the guest into the menu 106 and then the guest's order into the order menu 116. Once the guests are all entered, the hostess information is entered. Instead of selecting "Enter Guest Order" 103 from menu 62, "Enter Hostess Order" 105 is selected and menu 107 appears (FIG. 9). This menu reminds the consultant that all of the other guest orders should have been entered first. The hostess's order is entered just like the other guest orders. In the event that a referring hostess attended the show, her order is entered last so that a discount may be calculated based upon the total sales of the show. The consultant thus selects "Referring Hostess Information" 109 from the menu 62 and the menu screen 111 of FIG. 10 appears. The referring hostess necessarily has a customer ID so that is entered, identifying her as a referring hostess.

After the consultant has entered all of the information and orders from all of the guests, and she is confident the information entered is accurate, she closes the show. Closing the show entails selecting 113 from menu 62 causing the menu screen 115 (FIG. 11) to appear. Closing the show finalizes the orders and sends the information via the network 16 (FIG. 1) to the database 18. Upon closing the show, a summary screen 117 (FIG. 12) appears, showing all of the customers and their orders for that show.

At step 120 the process of filling the orders begins by accessing the database 18 using the server 20 and retrieving data from a closed show. The data is processed by the computer 20 and sent to the interface 21 for conversion into order forms 22. Preferably, each of the order forms 22 is retrieved by a worker who manually fills each order. Filling the order is accomplished by hand selecting each item on the order and individually wrapping the clothing items in a professional manner. The individual items for a given order are then bundled together and wrapped to form a package 24. Preferably, the order form 22 is taped to the package for identification purposes. Each of the packages 24 for that show are placed together in a box 26 and shipped to the hostess address. The hostess then notifies each of the guests that their packages 24 have arrived and are ready for pickup.

Inevitably, the demand for some items on a nationwide scale will be greater than the demand for others. In order to prevent a potentially embarrassing and inconvenient situation whereby a consultant takes a number of orders for items that are sold out, the present invention 10 includes an inventory management system that allows the consultant to access data related to sold out items, items that are in danger of becoming sold out, and expected supply dates for items that are in production.

Referring to FIG. 13, there is shown a diagrammatic representation of the system 10 of the present invention including a corporate headquarters 23 in addition to a warehouse or package assembly location 19. For purposes of tracking and updating product inventory, the corporate headquarters 23 provides input to the server 20 via the network 16 related to planned production levels. The server 20 can use this information to calculate the likelihood that an item will sell out soon and to provide to the consultant a status for each item, namely, a date when a sold out item is expected to be in stock, or an indication that a sold out item will no longer be produced.

The system 10 is also designed to effectuate easy access to inventory data as well as the processing of returns and exchanges. Because individual customer data is stored in the database 18, returns and exchanges can be processed for each individual customer from a remote location.

For example, FIGS. 14-24 provide online menus used to process a return or exchange of merchandise. At FIG. 14, a consultant logged into the system selects menu item 121, "Returns and Exchanges". This selection causes the menu 122 in FIG. 15 to open. The consultant selects option 124, "Return" or 126, "Exchange" as appropriate. The consultant also enters the customer's order number in field 128 and hits the "Continue" button 130.

If the consultant selected option 124, "Return" the consultant will next see the page 131 shown in FIG. 16. Included is a list 132 of the customer's purchased items 134. The consultant will check a box 136 next to the item 134 to be returned, and hit the "Continue" button 138 at the bottom of the page 131.

The next page 140 to appear is shown in FIG. 17. The item 134 selected to be returned is shown with a menu 142 providing various fields 144-150 that allow the consultant to list a reason for the return, a condition of the returned item, and a location of the damage on the item, if any. Also, a quantity field is provided if the customer purchased more than one of the item. Field 146, "Return Condition" provides a pulldown menu with "Good and unused" as an option. Selecting this option indicates that the item is in new condition and may be resold. Thus, when selected, the server 20 adds the quantity from field 150 back into a running inventory for that merchandise item. Upon filling in the fields 144-150, the consultant hits a "Continue" button 152 and is taken to the next page 154 (FIG. 18).

Page 154 summarizes the transaction and provides a confirmation number 158. The page 154 also provides an option 160 to print the page as a hard copy record of the return. The consultant will select this option 160 and the page 156 will be printed. The printed copy will be sent to the customer. Additionally, a popup screen 162 (FIG. 19) will appear. This screen 162 shows the printing label to be used to send the returned merchandise item 134 back to the warehouse 19. The screen 162 includes a print command 164 to effectuate printing. The consultant prints this mailing label and sends it to the costumer, either electronically or via standard mail, along with the printed copy of the transaction record from FIG. 18. FIG. 28 provides an example of an electronic letter 210 that includes a link 212 that allows a customer to print out a mailing label.

FIGS. 20-24 depict the menus encountered when processing an exchange. In FIG. 20, menu 122 is shown, the same menu shown in FIG. 15. This time, however, the exchange option 126 is selected, rather than the return option 124. Again, the customer order number is placed in the field 128 and clicks on the "Continue" button 130.

Next, the menu screen 166 appears as shown in FIG. 21. This screen 166 includes a list 132 of the customer's purchased items 134. The consultant will check a box 136 next to the item 134 to be returned, and hit the "Continue" button 138 at the bottom of the page 131.

The next page 168 to appear is shown in FIG. 22. The item 134 selected to be returned is shown with a menu 170 providing various fields 172-182 that allow the consultant to list a reason for the exchange, a condition of the exchanged item, and a location of the damage on the item, if any. Also, a quantity field is provided if the customer purchased more than one of the item. Fields 180 and 182 pertain to the item to be sent to the customer in exchange for the originally purchased items. Field 180 allows a color selection for the new item and field 182 allows a size selection for the new item.

Field 174, "Exchange Condition" provides a pulldown menu with "Good and unused" as an option. Selecting this option indicates that the item is in new condition and may be resold. Thus, when selected, the server 20 adds the returned item to the running inventory and subtracts the item to be shipped to the customer from the running inventory by the quantity from field 150. Upon filling in the fields 172-182, the consultant hits a "Continue" button 184 and is taken to the next page 186 (FIG. 23).

Page 186 summarizes the transaction and provides a confirmation number 188. The page 186 also provides an option 190 to print the page as a hard copy record of the return. The consultant will select this option 190 and the page 186 will be printed. The printed copy will be sent to the customer. Additionally, a popup screen 192 (FIG. 24) will appear. This screen 192 shows the printing label to be used to send the returned merchandise item 134 back to the warehouse 19. The screen 192 includes a print command 194 to effectuate printing. The consultant prints this mailing label and sends it to the costumer, either electronically or via standard mail, along with the printed copy of the transaction record from FIG. 18. FIG. 29 provides an example of an electronic letter 214 that includes a link 216 that allows a customer to print out a mailing label.

Referring now to FIG. 25, if a consultant would like to check the running inventory of one or more items, option 196, "Back Order/Watch List" is selected from the maintenance menu. Doing so brings the consultant to the screen 198 depicted in FIG. 26. This screen 198 provides the running inventory data for all of the merchandise items. The screen 198 includes columns for Item Code 200, Item Name 202, and an "Expected in Stock" date 204.

Determination as to whether an item appears on a watch list can be made in a variety of ways. For example, one aspect of the present invention provides a threshold inventory level for each item. The threshold level is a strategic business decision made at the corporate headquarters 23. The threshold level may be different for each item. Once the running inventory for each item passes below the threshold level, that item appears on the Watch list. A decision maker at headquarter 23 then makes a determination as to which items on the watch list will be restocked and which will be discontinued.

Figure 27:
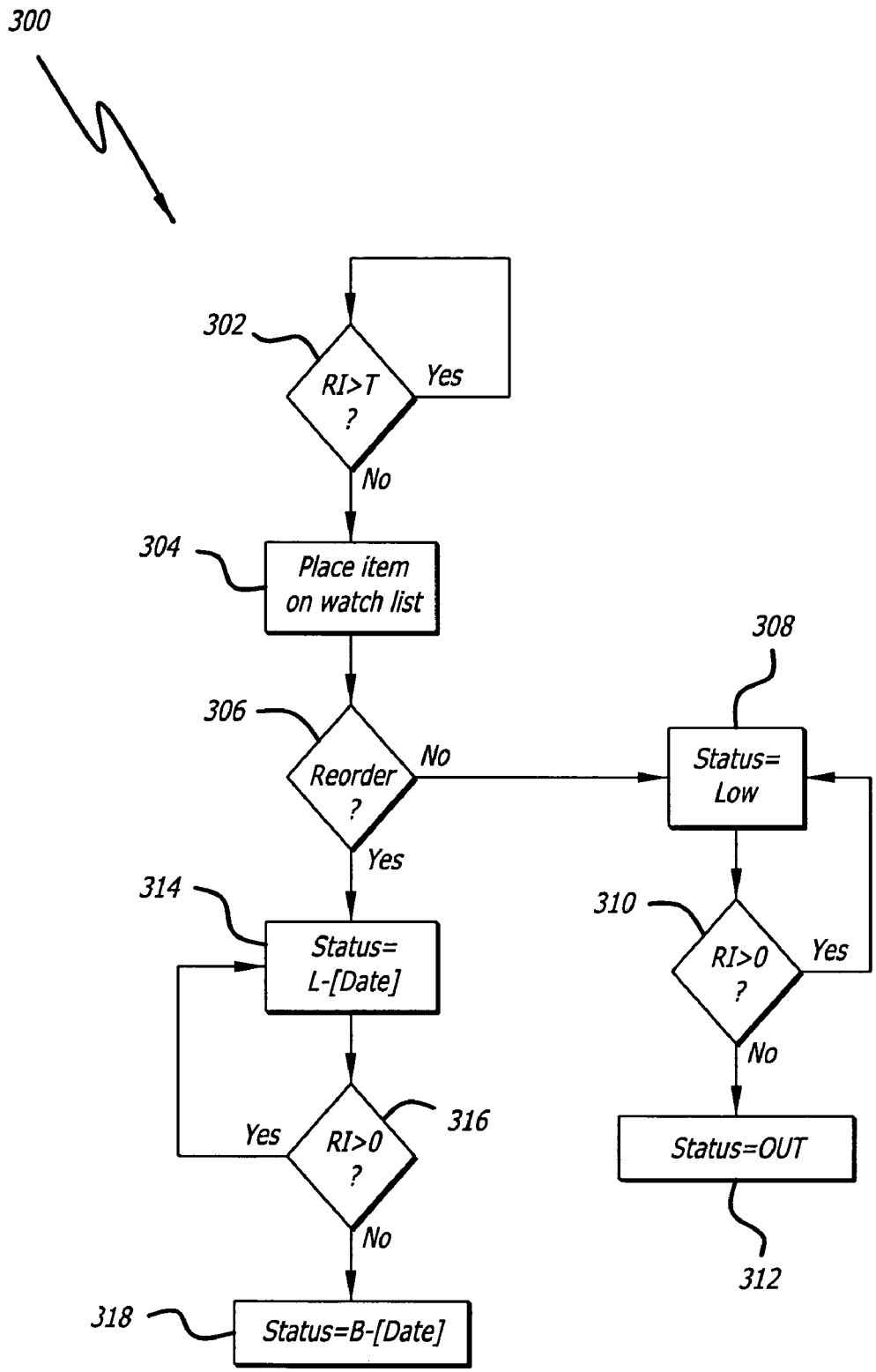
FIG. 27 is a flow chart of an aspect of the inventory management process of the present invention; and, FIGS. 28-29 are examples of electronic letters sent to customers making returns or exchanges.

Another aspect of the invention provides an algorithm approach to determine which items will appear on a watch list. FIG. 27 shows an algorithm 300 whereby a running inventory RI is compared to a threshold T at 302. The comparison is continually made until the running inventory RI is at or below the threshold level T, at which time the item is placed on the watch list at 304.

While on the watch list, a determination is made at 306 whether to reorder the item. A discussion is provided below concerning the factors taken into account in making this determination. If at 306 it is decided that the item will not be reordered, the status of the item is set to LOW at 308. Next, at 310, the running inventory is continually monitored and compared to a value of zero. If the running inventory drops to zero, the status for the item is changed to OUT at 312.

If at 306 a termination is made to reorder the item, or a reorder has already been placed, at 314 the status of the item is set to L-[date] where [date] is the expected shipment arrival date, that is, the date the reordered merchandise is expected to appear in inventory.

At 316, the running inventory RI is continually monitored and compared to a value of zero. If the running inventory RI equals zero, the status is set to B-[date] at 318, indicating that the item is on backorder and expected to be in stock on [date].

As mentioned above, one aspect of the present invention involves making the decision whether to reorder a quantity of a particular merchandise item. This is the decision made at 306 of FIG. 27. This may be accomplished by a particular individual taking into account factors such as: the current running inventory RI of the item; the estimated rate of sales for that item; the actual rate of sales experienced from a predetermined start date (typically the first day of a sales "season," where the season is a period of time during which a particular line of clothing is being offered for sale); the manufacturers lead time; the quantity on reorder; and the quantity on reorder in conjunction with a particular delivery date.

The current running inventory RI is the real-time inventory of a particular merchandise item at a given time, as discussed above.

The estimated sales rate for a particular item is the number of orders received per unit time. For example, if a sales season is three months long, an estimated sales rate for a particular item might be 2000 units per month.

The actual sales rate for a particular item is observed at some time mid-season and is used to adjust the estimated sales rate. Thus, if the projected sales rate for an item was 2000 units per month, and 3000 units were initially ordered (representing one half of the projected total sales for that item during the season), but 2000 items were sold during the first two weeks of the season, the actual sales rate is double the estimated sales rate. Thus, it will likely be decided to make a reorder of that item before the running inventory RI dips below the watch list threshold.

Manufacturers lead time is the amount of time it takes the manufacturer to fill and ship an order. One additional factor that must be considered when estimating the manufacturers lead time is the amount of raw material the manufacturer has on hand. If the reorder amount is high, it becomes more likely that the manufacturer will have to order more raw materials to fill the reorder. Because it is undesirable to acquire additional merchandise items late in the season, a long lead time may weigh in favor of not submitting a reorder.

As to the last two factors, it is not uncommon for a plurality of reorders to be made for a particular merchandise item. At the beginning of a season, an initial quantity of items is ordered. This quantity is typically about half of what the projected sales are for each item. This is done to prevent unwanted inventory at the end of a season. Each time a reorder is made, an expected shipping date is assigned to that reorder quantity. Each reorder quantity having a particular date is considered a "cut." Even if a reorder quantity is small, if several other cuts are already on order for a particular item, the likelihood that the manufacturer may run out of materials increases. Thus, the lead time may be extended.

Though these aforementioned factors are presently considered by an individual making the reorder decisions, it is considered within the scope of the present invention to develop a software program that makes these decisions automatically. For example, each factor could be given a positive or negative value depending on whether the occurrence weighs in favor or against submitting a reorder. Some factors could be given more weight than others. The values could be added together and a determination would be made based on whether the resulting sum is positive or negative.

Other factors may change the flow of the chart shown in FIG. 27. For example, even if an item has a status of OUT, a manufacturer may unexpectedly acquire additional raw material and be able to deliver a cut earlier than expected. This may change the reorder decision.

Additionally, as discussed above, the running inventory RI is affected in real time by returns and exchanges. Thus, an inventory item may jump from OUT to LOW or on and off the watch list altogether, when items are returned and repurchased.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of conducting sales transactions of women's outer garments using a party plan method of marketing comprising:

requiring the purchase, at least twice annually, of a sample line of women's outer garments at a cost substantially equal to or below a cost of production of said sample line of women's outer garments, said sample line of women's outer garments representative of styles and sizes of women's outer garments available for sale during a selling season;

showing said sample line of women's outer garments at a show held in a home;

providing, during said show, a running available inventory of women's outer garments by using a computer in data flow communication via a network with a database associated with an inventory of women's outer garments;

receiving order forms from a plurality of customers at said show, said customers comprising hostesses and guests, the order forms having data including: customer name; customer address; customer order, the customer order including one or more women's outer garments;

entering said data from the order forms into said database associated with said inventory of women's outer garments via said computer;

storing said data from the order forms in said database associated with said inventory of women's outer garments via said computer;

processing said data such that said one or more women's outer garments is subtracted from the running available inventory of women's outer garments;

assembling the women's outer garments from each of said order forms into individual packages prior to a shipment of said packages to said home;

shipping said individual packages to said home; and distributing said women's outer garments from said home to said customers without using postal services, thereby avoiding the incurrence of additional shipping costs.

2. The method of claim 1 further comprising providing a warning message if said inventory of women's outer garments is low or empty for a given women's outer garment.

3. The method of claim 1 further comprising establishing a lower inventory limit for each women's outer garment available for sale at said shows and generating a watch list, accessible remotely, comprising those women's outer garments having an inventory at or below said lower inventory limit.

4. The method of claim 1 further comprising generating a sold out list, accessible remotely, comprising women's outer garments for sale at said shows having an inventory of zero.

5. The method of claim 3 wherein generating a watch list further comprises providing data pertaining to each women's outer garment regarding whether said women's outer garment will be available in the future.

6. The method of claim 5 wherein providing data pertaining to each women's outer garment regarding whether said women's outer garment will be available in the future comprises providing a date when said women's outer garment is expected to be in stock.

7. A system for effecting sales transactions of women's out garments using a party plan method of marketing comprising:
   - a show hosted by a hostess and attended by at least one customer and a consultant;
   - a sample line of women's outer garments, required to be purchased at least twice annually, by a consultant at a cost substantially equal to or below a cost of production of said sample line of women's outer garments, said sample line of women's outer garments representative of styles and sizes of women's outer garments available for sale during the selling season;
   - a computer into which customer orders initiated at said show are entered, said customer orders including at least one women's outer garment;
   - a database associated with an inventory of women's outer garments and in data flow communication via a network with said computer and configured to store said customer orders;
   - a server in data flow communication via a network with said database associated with an inventory of women's outer garments and configured to subtract said women's outer garment from a running inventory of available merchandise items women's outer garments, said running inventory of available women's outer garments accessible from said computer during said show, said server further configured to direct formation of an individual package for each of said customer orders initiated at said show, said individual package including said women's outer garments from a single customer order
   - an output device in data flow communication with said server and configured to generate a shipping label for shipment of all said packages to said hostess.

8. The system of claim 7 further comprising data flow communication with the internet.

9. The system of claim 7 further comprising data flow communication to an intranet.

10. The system of claim 7 wherein the server is further configured to receive customer return data from the computer, said customer return data including at least one women's outer garment return request.

11. The system of claim 10 wherein the server is further configured to add the at least one women's outer garment return request to the running inventory of available women's outer garments in the event that the computer indicates the women's outer garment item is unused.

12. The system of claim 7 wherein the server is further configured to receive customer exchange data from the computer, said customer exchange data including at least one women's outer garment exchange request indicating a women's outer garment to be sent by the customer and a women's outer garment to be sent to the customer.

13. The system of claim 12 wherein the server is further configured to add the women's outer garment to be sent by the customer to the running inventory of available women's outer garments in the event that the computer indicates the women's outer garment is unused.

14. The system of claim 13 wherein the server is further configured to subtract the women's outer garment to be sent to the customer from the running inventory of available women's outer garments.

* * * * *